July 15, 1958
V. H. BERRY ET AL
2,843,172
STONE REJECTING TIRE TREAD
Filed Aug. 15, 1955
3 Sheets-Sheet 1
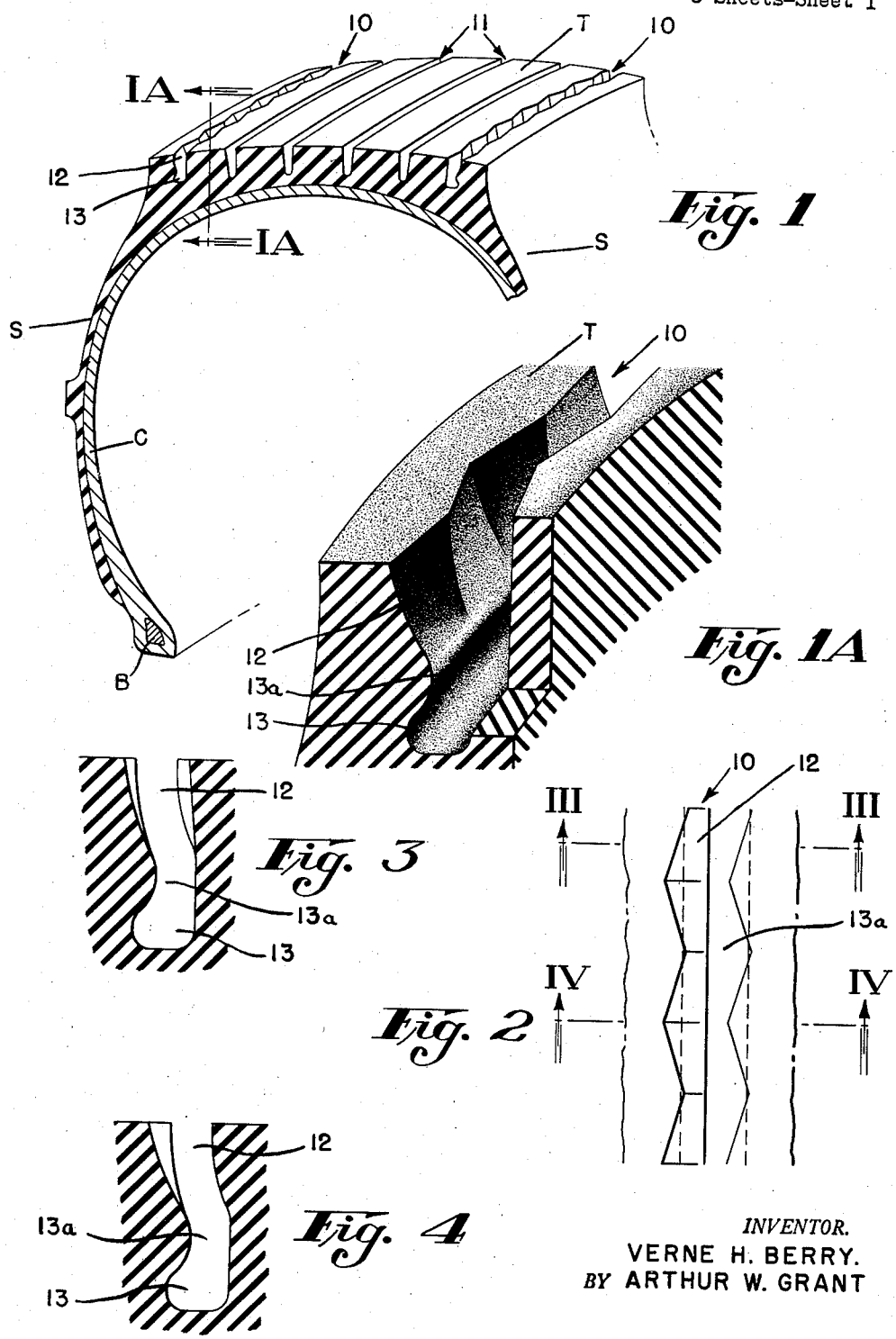
INVENTOR.
VERNE H. BERRY.
BY ARTHUR W. GRANT
ATTORNEY July 15, 1958  V. H. BERRY ET AL  2,843,172
STONE REJECTING TIRE TREAD
Filed Aug. 15, 1955  3 Sheets-Sheet 2

INVENTOR.
VERNE H. BERRY
BY ARTHUR W. GRANT

ATTORNEY.

July 15, 1958 V. H. BERRY ET AL 2,843,172
STONE REJECTING TIRE TREAD
Filed Aug. 15, 1955 3 Sheets-Sheet 3
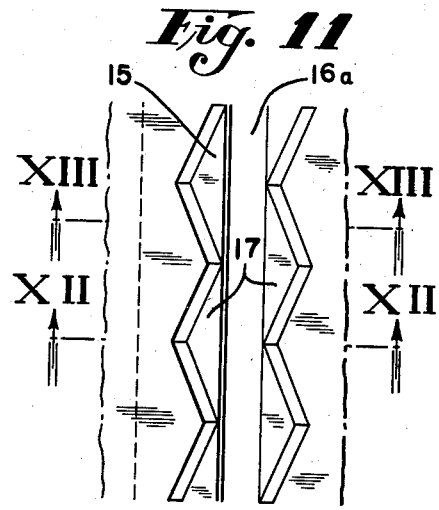
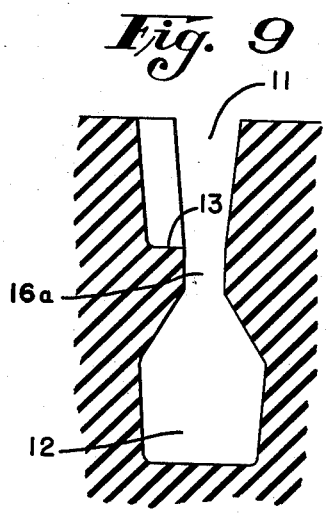
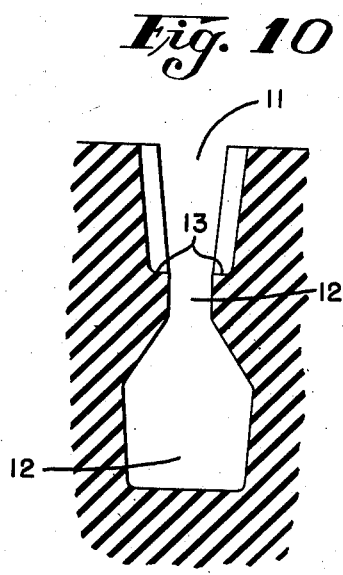
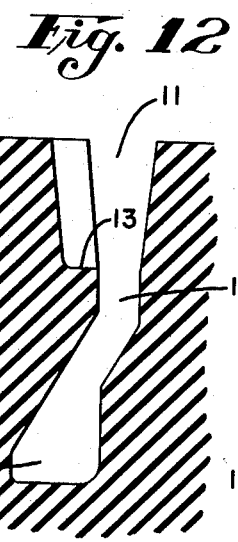
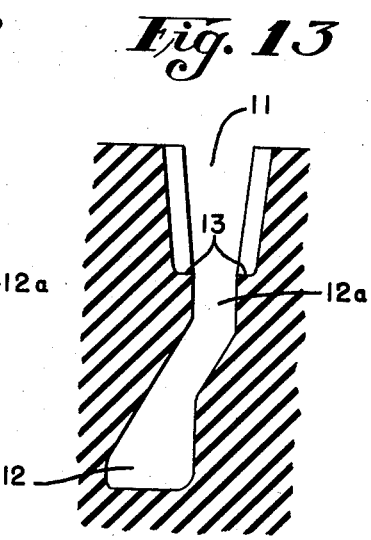
INVENTOR.
VERNE H. BERRY
BY ARTHUR W. GRANT
ATTORNEY.

United States Patent Office 2,843,172
Patented July 15, 1958

2,843,172

STONE REJECTING TIRE TREAD

Verne H. Berry, Roseville, and Arthur W. Grant, Detroit, Mich., assignors to United States Rubber Company, New York, N. Y., a corporation of New Jersey Application August 15, 1955, Serial No. 528,288

3 Claims. (Cl. 152—209)

This invention relates to pneumatic tires incorporating anti-skid grooves of a shape to minimize stone pick-up and stone retention.

The rubber treads of pneumatic tires are commonly provided with a plurality of transversely spaced, circumferentially continuous, relatively narrow anti-skid grooves to increase the traction properties and flexibility of the treads. Such grooves are commonly made circumferentially straight or of a tortuous shape, i. e., zig-zag, sinuous, etc.

Grooves of a tortuous shape are considered preferable because such a shape provides a much greater length of groove edge effective for increasing the traction and anti-skid properties of the tread, and also presents the groove edges in various directions so as to increase the traction and anti-skid properties in all directions.

The provision, however, of anti-skid grooves of either shape poses a problem of stones being picked up and retained in the anti-skid grooves. Stones so picked up and retained cause abrasive and abnormal flexing in the bases of the grooves resulting in cracks or other injuries developing. Stones so picked up in the grooves also cause objectionable noise when the tires are operated on smooth pavements.

While the problem of stone pick-up and retention has been fairly well solved in the use of circumferentially straight anti-skid grooves, by shaping the grooves in accordance with U. S. Patent No. 2,121,871 or U. S. Patent No. 2,637,362, both assigned to the assignee of the instant application, no satisfactory solution has heretofore been proposed to eliminate the problem of stone pick-up and retention in anti-skid grooves of a generally tortuous shape.

The primary object of the present invention is, therefore, to provide an anti-skid groove for a tire tread which will have the advantages of the tortuous form but at the same time will minimize stone pick-up and stone retention.

To this end, the anti-skid grooves of the invention include a circumferentially continuous, tortuously extending outer portion superimposed on and communicating with a circumferentially straight inner portion having a narrow or restricted width at the juncture thereof with the outer portion.

It has been found that a groove so formed in accordance with the invention will have the advantages of a conventional tortuously extending groove, but at the same time will minimize stone pick-up and retention. Further, because the sides of the inner portion of the grooves are all surfaces of revolution, it has been found that manufacture of molds for forming such grooves is materially facilitated.

Other objects and advantages of the invention will become apparent from the following description when read in conjunction with the accompanying drawings, wherein:

Fig. 1 is a perspective sectional view of a portion of a pneumatic tire incorporating both conventional straight anti-skid tread grooves, and anti-skid tread grooves formed in accordance with the present invention; the grooves formed in accordance with the present invention being the ones adjacent each shoulder of the tire;

Fig. 1A is an enlarged sectional view taken on the line IA—IA of Fig. 1;

Fig. 2 is a plan view of the groove illustrated in Fig. 1A, showing the tortuous form of the outer portion thereof; the particular form illustrated being zig-zag;

Fig. 3 is a sectional view taken on the line III—III of Fig. 2;

Fig. 4 is a sectional view taken on the line IV—IV of Fig. 2;

Fig. 9 is a sectional view taken on the lines IX—IX of either Fig. 6, Fig. 7 or Fig. 8;

Fig. 10 is a sectional view taken on the lines X—X of either Fig. 6, Fig. 7 or Fig. 8;

Fig. 11 is a partial plan view of a tire showing another form for the inner circumferentially straight portion of the anti-skid grooves of the invention;

Fig. 12 is a sectional view taken on the lines XII—XII of Fig. 11; and

Fig. 13 is a sectional view taken on the lines XIII—XIII of Fig. 11.

Figure 5:
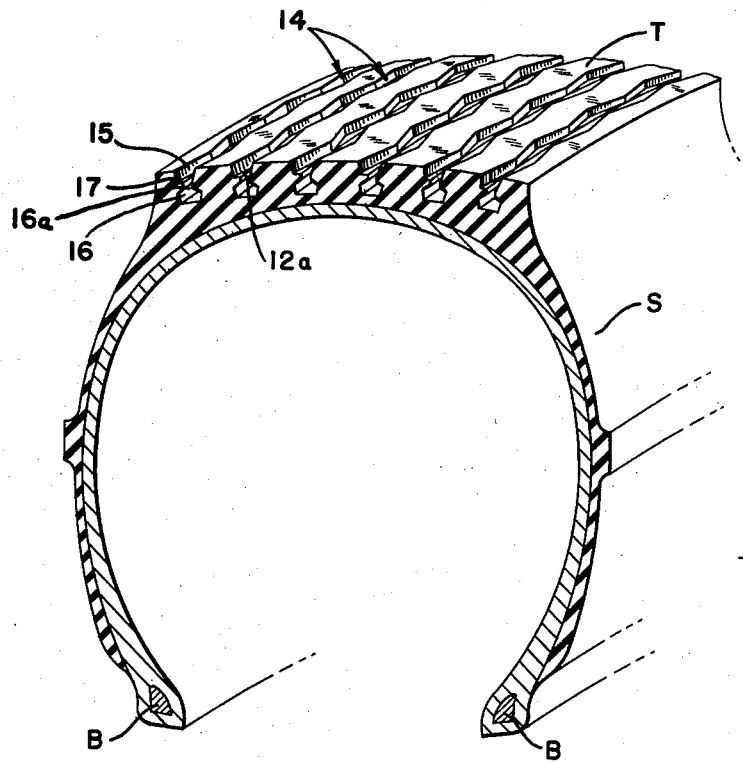
Fig. 5 is a perspective sectional view of a portion of a pneumatic tire similar to that of Fig. 1 but showing a modified form of anti-skid groove formed in accordance with the invention.

Referring to the drawings, and in particular to Fig. 1, there is shown a section of a pneumatic tire incorporating in the rubber tread T thereof, two anti-skid grooves 10 formed in accordance with the present invention and four conventional straight grooves 11. While only two grooves 10, formed in accordance with the present invention, are shown in Fig. 1, it will be appreciated that the grooves 11 could have the same form as grooves 10. However, when only two grooves of the form of the invention are provided, they are preferably formed, as illustrated in Fig. 1, in the tread adjacent each shoulder of the tire as stone pick-up or retention is more prevalent in grooves provided in this region of the tread.

In accordance with the invention, the grooves 10 have an outer tortuously extending portion 12 superimposed on and communicating continuously with an inner circumferentially straight portion 13 having a narrow or restricted width at the juncture 13a thereof with the outer portion 12. It is to be understood that the grooves 10 are continuous around the full circumference of the tread.

The tire illustrated is otherwise of conventional construction and includes, in addition to the rubber tread T, rubber sidewalls S, a fabric carcass C, and annular bead wire bundles B to which the carcass is anchored during molding and vulcanizing of the tire. The tire is fabricated and molded in the conventional manner and the anti-skid grooves 10 are formed in the tread T during molding thereof. The term rubber is used to denote natural rubber, synthetic rubber and blends thereof.

The tortuously extending portion 12 of the grooves 10 as illustrated in Fig. 1, is of a generally zig-zag form, but other tortuous forms may be used as will be described in detail hereafter in conjunction with the modification shown in Fig. 5. The circumferentially straight portion 13 of the grooves 10 as illustrated in Fig. 1 is shown as having a dog-leg shape, i. e., offset laterally and enlarged below the communicating portion 13a as best shown in Figs. 1A, 3 and 4, but as will also be described in conjunction with the modification of Fig. 5, the inner portion 13 may be of bottle shape, i. e., comparatively wide at the base thereof and narrowing down at the communicating portion 13a. The tortuously extending portion 12 of the grooves 10 tapers inwardly from the surface of the tread and blends smoothly with the inner straight portion 12 as best shown in Figs. 1A, 3 and 4.

Referring to Fig. 5, the modified form of groove 14 shown therein, like the grooves 10, illustrated in Fig. 1, includes a tortuously extending outer portion 15 superimposed on and communicating continuously with the circumferentially straight inner portion 16 having a narrow or restricted width at the juncture 16a thereof with the outer portion 15. Like the grooves 10 illustrated in Fig. 1, the outer tortuously extending portion 15 of the groove 14 of Fig. 5, tapers inwardly from the tread of the tire, but unlike the grooves 10 of Fig. 1, the outer portion 14 does not blend smoothly with the inner portion 16. Instead the communicating portion 16a has a width substantially less than the width of the tortuously extending outer portion 15 at the base thereof so as to provide projection shoulders 17 at the base of the tortuously extending portion 15.

Figure 6:
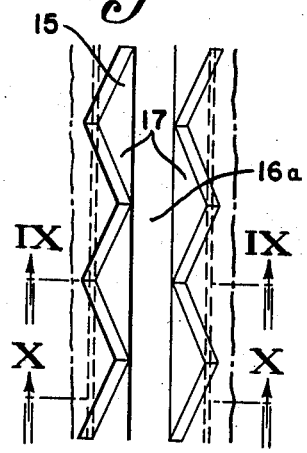
Fig. 6 is a partial plan view of the tread of the tire illustrated in Fig. 5, showing the tortuous form of the outer portion of the anti-skid groove; the particular form illustrated being zig-zag.
Figure 7:
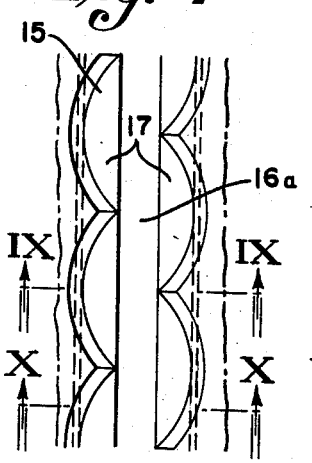
Fig. 7 is a partial plan view similar to that of Fig. 6, but showing another tortuous form of the outer portion that the anti-skid grooves may have; the particular form illustrated being generally sinuous.
Figure 8:
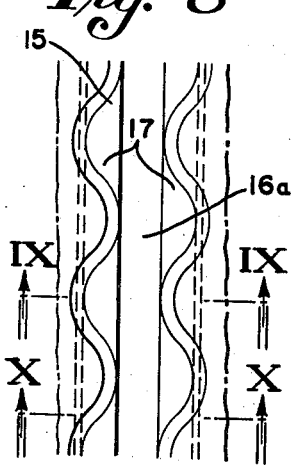
Fig. 8 is a partial plan view similar to that of Fig. 6 showing still another tortuous form the outer portion of the anti-skid groove may have; the particular form illustrated being also sinuous but of somewhat different form from that shown in Fig. 6.

The tortuously extending portion of the grooves 10 of Fig. 1 or the grooves 14 of Fig. 5 may be of any of a number of tortuous forms, such as zig-zag as shown in Figs. 2, 6 and 11 or sinuous as shown in Figs. 7 and 8. The sinuous form of Fig. 7 is provided by making the walls thereof of connected concave sections with the concave sections of one wall staggered relative to the concave sections of the opposed wall. The sinuous form of Fig. 8 is provided by making the sides of connected alternately convexed and concave sections. The depth of the tortuous portion 12 of the grooves 10 or portion 15 of the grooves 14 is preferably not more than 25% greater than the width thereof at the surface of the tread T.

The circumferentially straight inner portion 16 of the anti-skid grooves 14 may be of a bottle shape, i. e., comparatively wide at the base thereof and narrowing down to communicating portion 16a as shown in Figs. 5, 9 and 10, or may be of a dog-leg shape, i. e., off-set laterally and enlarged below the communicating portion 16a as best shown in Figs. 11, 12 and 13. As previously described, the circumferentially straight inner portion 13 of the grooves 10 of Fig. 1, may also be either of a bottle shape or a dog-leg shape.

As can be best seen in Figs. 6, 7 and 8, the shoulders 17 on any one side of a groove 14 are not circumferentially continuous, but where the shoulders 17 on one side decrease in width, the shoulders 17 on the other side increase in width with the resulting functional effect of a continuous shoulder which increases the effectiveness of the restricted portion 16a in preventing entry of the stones of a size that would cause damage to the circumferentially straight inner portion 12.

The tapering of the sides of the tortuously extending outer portion 12 of the grooves 10, illustrated in Fig. 1 or the tortuously extending outer portion 15 of the grooves 14 illustrated in Fig. 5, facilitate the ejection of stones stopped from entry into the inner portion 13 or 16 by the restricted portions 13a or 16a.

From the above description it can be seen that there is provided an anti-skid groove construction which has the advantages of a tortuously extending groove and at the same time is effective to minimize stone pick-up and retention.

While preferred forms of the invention have been shown and described, it is to be understood that this is for the purpose of illustration only and that changes and modifications may be made therein without departing from the spirit and scope of the invention.

Having thus described our invention, what we claim and desire to protect by Letters Patent is:

1. In a tire having a rubber tread, a circumferentially continuous inwardly converging anti-skid groove formed in the surface of said tread, said groove having a tortuously extending outer portion of uniform width at the tire surface and superimposed on and communicating with a circumferentially straight inner portion, the inner portion being restricted in width at the juncture thereof with the outer portion.

2. In a tire having a rubber tread, a circumferentially continuous inwardly converging anti-skid groove formed in the surface of said tread, said groove having a zig-zag outer portion of uniform width at the tire surface and superimposed on and communicating with the circumferentially straight inner portion, the inner portion being restricted in width at the juncture thereof with the outer zig-zag portion.

3. In a pneumatic tire having a rubber tread, a circumferentially continuous inwardly converging anti-skid groove formed in the surface of said tread, said groove having a sinuous outer portion of uniform width at the tire surface and superimposed on and communicating with the circumferentially straight inner portion, the inner portion being restricted in width at the juncture thereof with the outer portion.

References Cited in the file of this patent

UNITED STATES PATENTS

| | | |
|---|---|---|
| 2,121,871 | Havens | June 28, 1938 |
| 2,260,193 | Overman | Oct. 21, 1941 |
| 2,322,505 | Bull | June 22, 1943 |
| 2,604,920 | Kirby | July 29, 1952 |
| 2,637,362 | Briscoe et al. | May 5, 1953 |